United States Patent
Hahn

(10) Patent No.: US 11,277,876 B2
(45) Date of Patent: Mar. 15, 2022

(54) METHOD AND APPARATUS FOR LOW LATENCY COMMUNICATION IN VEHICLE-TO-EVERYTHING COMMUNICATION SYSTEM

(71) Applicants: Hyundai Motor Company, Seoul (KR); Kia Motors Corporation, Seoul (KR)

(72) Inventor: Gene Beck Hahn, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/364,839

(22) Filed: Mar. 26, 2019

(65) Prior Publication Data
US 2019/0306908 A1    Oct. 3, 2019

Related U.S. Application Data

(60) Provisional application No. 62/650,508, filed on Mar. 30, 2018.

(30) Foreign Application Priority Data

Mar. 11, 2019    (KR) .................. 10-2019-0027464

(51) Int. Cl.
| | | |
|---|---|---|
| *H04W 76/18* | (2018.01) | |
| *H04W 76/38* | (2018.01) | |
| *H04W 76/27* | (2018.01) | |
| *H04W 4/40* | (2018.01) | |

(52) U.S. Cl.
CPC ............. *H04W 76/18* (2018.02); *H04W 4/40* (2018.02); *H04W 76/27* (2018.02); *H04W 76/38* (2018.02)

(58) Field of Classification Search
None
See application file for complete search history.

(56) References Cited

U.S. PATENT DOCUMENTS

| 8,712,411 B1 * | 4/2014 | Puliatti ................. H04W 76/00 455/435.1 |
|---|---|---|
| 2013/0128682 A1 * | 5/2013 | Henderson ........ G11C 11/40611 365/222 |
| 2018/0146492 A1 * | 5/2018 | Luo ................... H04W 72/1252 |
| 2018/0176834 A1 * | 6/2018 | Wei ................... H04W 36/0066 |

(Continued)

*Primary Examiner* — Lonnie V Sweet
(74) *Attorney, Agent, or Firm* — Mintz Levin Cohn Feris Glovsky and Popeo, P.C.; Peter F. Corless

(57) ABSTRACT

An operation method of a terminal in a vehicle-to-everything (V2X) communication system may include: transmitting an indicator requesting provision of a low-latency communication service to a first base station; receiving from the first base station a radio link failure (RLF) triggering condition configured according to requirements of the low-latency communication service; measuring a radio link between the terminal and the first base station based on the RLF triggering condition; and in response to detecting a problem of the radio link, selecting a resource within an exceptional resource pool indicated by the first base station, and performing communication with the first base station using the selected resource during a duration beginning when the problem of the radio link is detected until a timer used for declaring an RLF expires.

17 Claims, 8 Drawing Sheets

(56) References Cited

U.S. PATENT DOCUMENTS

| | | | |
|---|---|---|---|
| 2018/0192426 A1* | 7/2018 | Ryoo | H04W 72/085 |
| 2018/0270791 A1* | 9/2018 | Park | H04W 8/24 |
| 2018/0270792 A1* | 9/2018 | Park | H04W 76/28 |
| 2018/0279168 A1* | 9/2018 | Jheng | H04W 28/04 |
| 2019/0124669 A1* | 4/2019 | Luo | H04W 72/048 |
| 2019/0174421 A1* | 6/2019 | Quan | H04W 52/0274 |
| 2019/0174554 A1* | 6/2019 | Deenoo | H04W 16/14 |
| 2019/0191483 A1* | 6/2019 | Ryoo | H04W 76/27 |
| 2019/0327641 A1* | 10/2019 | Mok | H04W 4/40 |
| 2019/0380056 A1* | 12/2019 | Lee | H04L 43/0882 |
| 2019/0387438 A1* | 12/2019 | Chang | H04W 36/0055 |
| 2020/0059404 A1* | 2/2020 | Liu | H04W 76/27 |
| 2020/0059896 A1* | 2/2020 | Xu | H04W 24/02 |
| 2020/0100253 A1* | 3/2020 | Liu | H04W 76/27 |
| 2020/0154326 A1* | 5/2020 | Deenoo | H04W 24/08 |

* cited by examiner

METHOD AND APPARATUS FOR LOW LATENCY COMMUNICATION IN VEHICLE-TO-EVERYTHING COMMUNICATION SYSTEM

CROSS-REFERENCE TO RELATED APPLICATIONS

This application claims the benefit of priority to U.S. Provisional Patent Application No. 62/650,508, filed on Mar. 30, 2018 in the U.S. Patent and Trademark Office, and Korean Patent Application No. 10-2019-0027464, filed on Mar. 11, 2019 in the Korean Intellectual Property Office (KIPO), the entire contents of which are incorporated herein by reference.

BACKGROUND

1. Technical Field

The present disclosure relates generally to vehicle-to-everything (V2X) communication, and more specifically, to a method and an apparatus for preventing a transmission latency due to a radio link failure (RLF) in a V2X communication system.

2. Related Art

Various systems have been developed for processing of wireless data such as the fourth-generation (4G) communication system (e.g., Long Term Evolution (LTE) communication system or LTE-Advanced (LTE-A) communication system) and the fifth-generation (5G) communication system (e.g., New Radio (NR) communication system), which uses a frequency band higher than the frequency band of the 4G communication system. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In many cellular communication systems, the V2X communications (e.g., C-V2X communications) may be performed based on "sidelink" communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels.

In cellular communication systems supporting the V2X communication, a terminal located in a vehicle may use a resource allocated by a base station or a resource arbitrarily selected within a resource pool configured by the base station to perform the V2X communication. The terminal may measure a channel busy ratio (CBR) periodically or when a preconfigured event occurs, and may transmit a measurement result of the CBR to the base station. The base station may receive the measurement result of the CBR from the terminal, and identify a channel congestion degree based on the measurement result of the CBR. Also, the base station may adjust transmission parameters (e.g., modulation and coding scheme (MCS), maximum transmission power, range of retransmission counts per transport block (TB), etc.) based on the channel congestion degree.

Meanwhile, if a problem of the radio link is detected, and the radio link is not recovered before expiration of a timer, the terminal (e.g., the terminal located in the vehicle) may perform V2X communication using a resource arbitrarily selected within an exceptional resource pool indicated by a system information block (SIB) received from a serving cell. However, since the exceptional resource pool cannot be used when the RLF is detected until the timer expires, the terminal may be unable to perform the V2X communication. In this case, transmission of URLLC data, as mentioned above, may not meet the requirements of URLLC service.

SUMMARY

Accordingly, embodiments of the present disclosure provide an apparatus and a method for preventing transmission latency due to RLF in a V2X communication system.

According to embodiments of the present disclosure, an operation method of a terminal in a V2X communication system may include: transmitting an indicator requesting provision of a low-latency communication service to a first base station; receiving from the first base station a radio link failure (RLF) triggering condition configured according to requirements of the low-latency communication service; measuring a radio link between the terminal and the first base station based on the RLF triggering condition; and in response to detecting a problem of the radio link, selecting a resource within an exceptional resource pool indicated by the first base station, and performing communication with the first base station using the selected resource during a duration beginning when the problem of the radio link is detected until a timer used for declaring an RLF expires.

The operation method may further include performing a connection configuration procedure with a second base station, different from the first base station, during the duration beginning when the problem of the radio link is detected until the timer expires.

After the connection configuration procedure is completed, an operation state of the terminal which is connected to the second base station may transition from a radio resource control (RRC) connected state to an RRC inactive state.

The operation method may further include, when the radio link is recovered before the timer expires, performing a connection release procedure between the terminal and the second base station after the timer expires.

The operation method may further include, when the radio link is not recovered before the timer expires, performing communication with the second base station after the timer expires.

The RLF triggering condition may be received through an RRC message, a medium access control (MAC) control element (CE), or downlink control information (DCI).

The RLF triggering condition may include a first threshold for detecting unsynchronization in the low-latency communication service, the first threshold being less than a corresponding threshold for a communication service other than the low-latency communication service.

The first threshold for the low-latency communication service may be a block error rate (BLER) of $10^{-6}$.

The RLF triggering condition may include a second threshold of the low-latency communication service for determining whether the problem has occurred in the radio link, the second threshold being less than a corresponding threshold for a communication service other than the low-latency communication service.

The second threshold may be a threshold for a number of unsynchronization indications.

The RLF triggering condition may include a timer value of the timer for the low-latency communication service, the timer value being less than a corresponding timer value for a communication service other than the low-latency communication service.

Furthermore, according to embodiments of the present disclosure, an operation method of a base station in a V2X communication system may include: receiving from a terminal an indicator requesting provision of a low-latency communication service; configuring a radio link failure (RLF) triggering condition according to requirements of the low-latency communication service; and transmitting the RLF triggering condition to the terminal.

The operation method may further include, in response to detecting a problem of a radio link between the terminal and the base station, performing communication with the terminal using an exceptional resource pool indicated by the base station during a duration beginning when the problem of the radio link is detected until a timer used for declaring an RLF expires.

The RLF triggering condition may include a first threshold for detecting unsynchronization in the low-latency communication service, the first threshold being less than a corresponding threshold for a communication service other than the low-latency communication service.

The RLF triggering condition may include a second threshold of the low-latency communication service for determining whether a problem has occurred in the radio link, the second threshold being less than a corresponding threshold for a communication service other than the low-latency communication service.

The RLF triggering condition may include a timer value of the timer for the low-latency communication service, the timer value being less than a corresponding timer value for a communication service other than the low-latency communication service.

Furthermore, according to embodiments of the present disclosure, a terminal in a V2X communication system may comprise a processor and a memory storing at least one instruction, wherein, when the at least one instruction is executed by the processor, the processor may be configured to: transmit an indicator requesting provision of a low-latency communication service to a first base station; receive from the first base station a radio link failure (RLF) triggering condition configured according to requirements of the low-latency communication service; measure a radio link between the terminal and the first base station based on the RLF triggering condition; and in response to detecting a problem of the radio link, select a resource within an exceptional resource pool indicated by the first base station, and perform communication with the first base station using the selected resource during a duration beginning when the problem of the radio link is detected until a timer used for declaring an RLF expires.

The processor may be further configured to perform a connection configuration procedure with a second base station during the duration beginning when the problem of the radio link is detected until the timer expires.

The processor may be further configured to, when the radio link is recovered before the timer expires, perform a connection release procedure between the terminal and the second base station after the timer expires.

The processor may be further configured to, when the radio link is not recovered before the timer expires, perform communication with the second base station after the timer expires.

According to the embodiments of the present disclosure, during a duration beginning when a problem of a radio link is detected until expiration of a timer, the terminal can perform V2X communication using a resource selected within an exceptional resource pool. Also, the terminal can perform a connection configuration procedure with another base station before the expiration of the timer. Therefore, transmission latency due to a radio link failure (RLF) can be reduced. In addition, an RLF triggering condition can be reconfigured to meet the requirements of URLLC service, and the reconfigured RLF triggering condition can be used to reduce the transmission latency due to the RLF. Therefore, the performance of a V2X communication system can be improved.

BRIEF DESCRIPTION OF DRAWINGS

Embodiments of the present disclosure will become more apparent by describing in detail embodiments of the present disclosure with reference to the accompanying drawings, in which.

Figure 1:
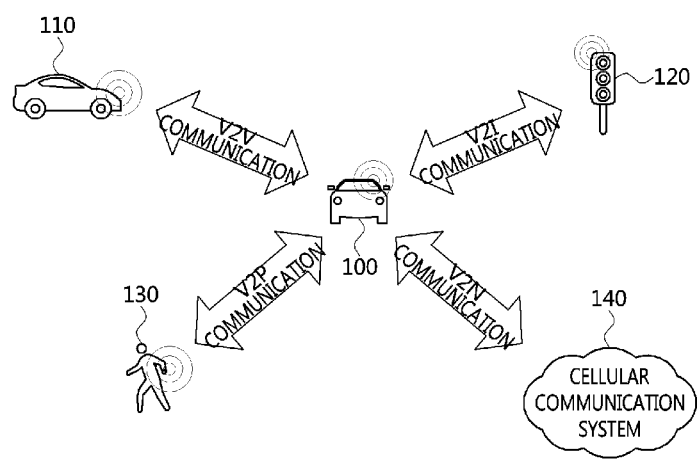
FIG. 1 is a conceptual diagram illustrating V2X communication scenarios.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus (e.g., communication node) comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
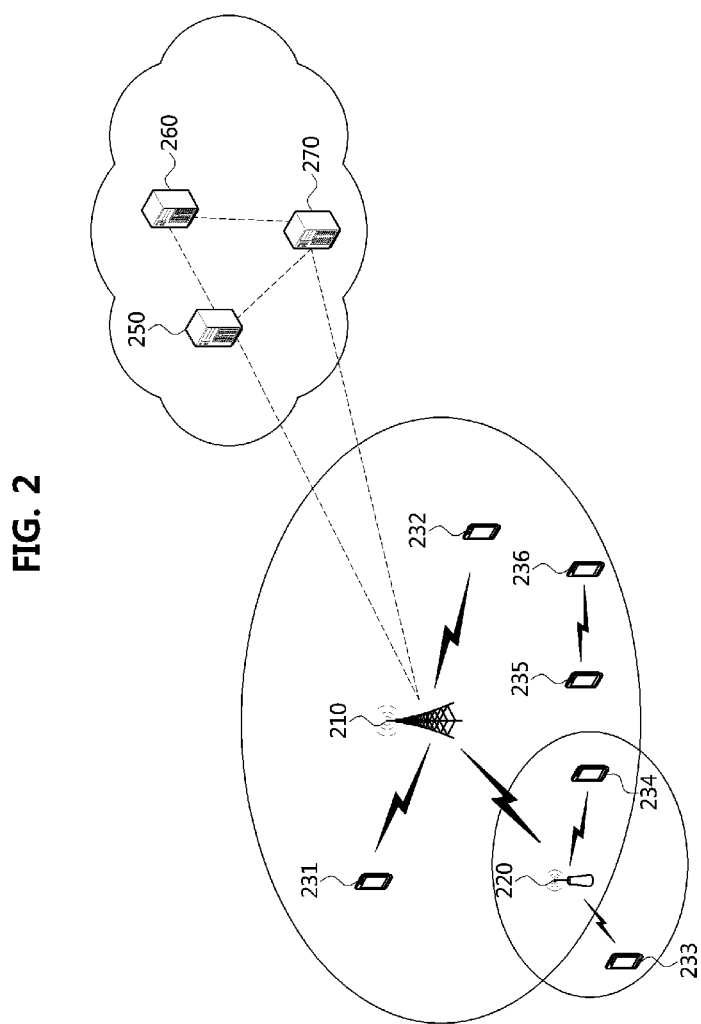
FIG. 2 is a conceptual diagram illustrating embodiments of a cellular communication system.

FIG. 2 is a conceptual diagram illustrating embodiments of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

Also, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier PUMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
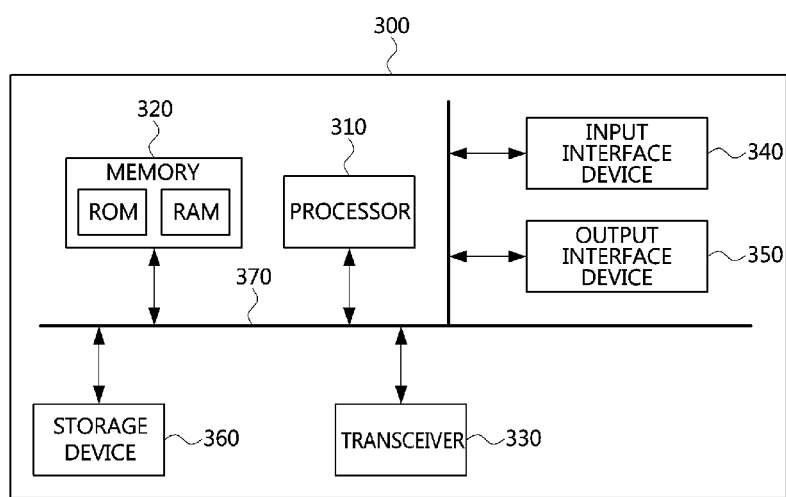
FIG. 3 is a conceptual diagram illustrating embodiments of a communication node constituting a cellular communication system.

FIG. 3 is a conceptual diagram illustrating embodiments of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
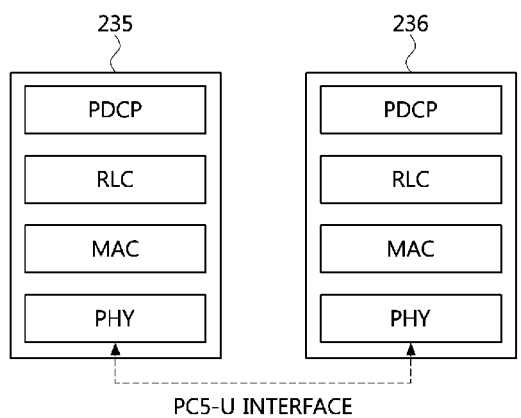
FIG. 4 is a block diagram illustrating embodiments of a user plane protocol stack of an UE performing sidelink communication.

FIG. 4 is a block diagram illustrating embodiments of a user plane protocol stack of an UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
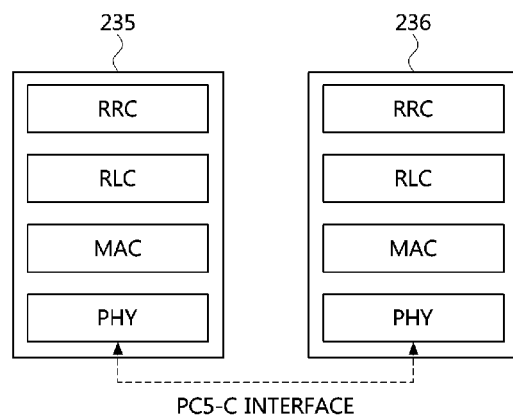
FIG. 5 is a block diagram illustrating a first embodiment of a control plane protocol stack of an UE performing sidelink communication.
Figure 6:
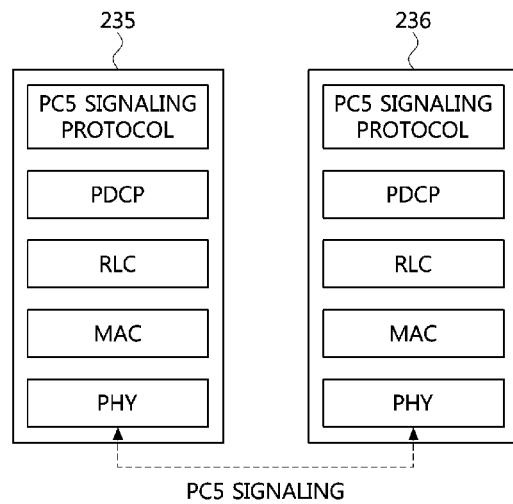
FIG. 6 is a block diagram illustrating a second embodiment of a control plane protocol stack of an UE performing sidelink communication.

FIG. 5 is a block diagram illustrating a first embodiment of a control plane protocol stack of an UE performing sidelink communication, and FIG. 6 is a block diagram illustrating a second embodiment of a control plane protocol stack of an UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236.

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure, etc.). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, methods for preventing transmission latency due to a radio link failure (RLF) in the V2X communication system described above will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of the vehicle 100 is described, the corresponding vehicle 110 may perform an operation corresponding to the operation of the vehicle 100. Conversely, when an operation of the vehicle 110 is described, the corresponding vehicle 100 may perform an operation corresponding to the operation of the vehicle 110. In the embodiments described below, the operation of the vehicle may be the operation of the communication node located in the vehicle.

Figure 7:
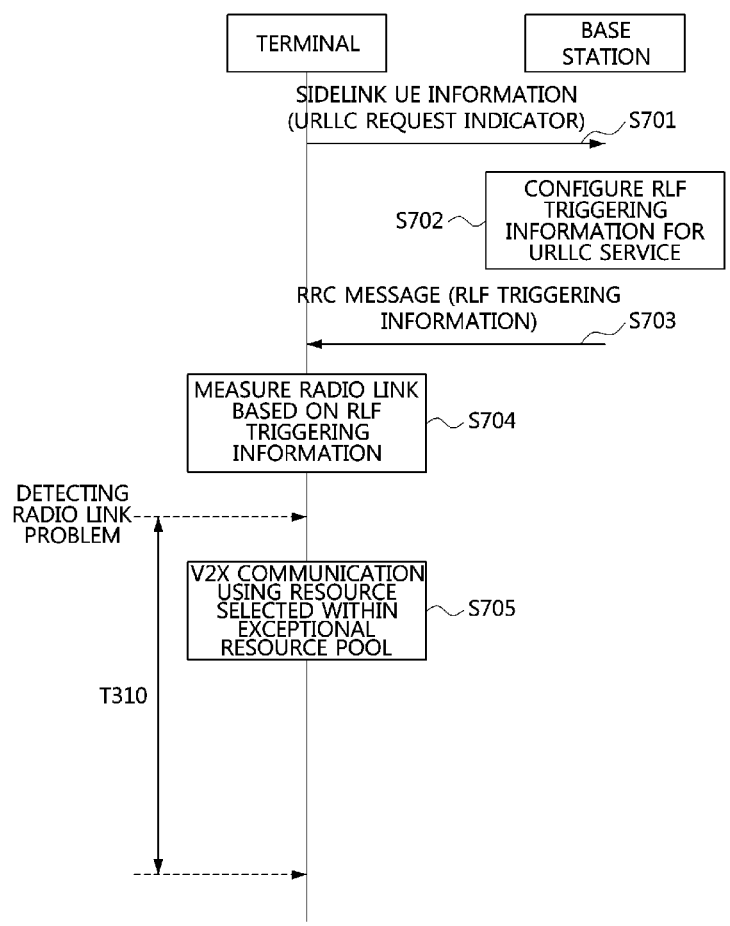
FIG. 7 is a sequence chart illustrating a first embodiment of a low-latency communication method in a V2X communication system.

FIG. 7 is a sequence chart illustrating a first embodiment of a low-latency communication method in a V2X communication system.

As shown in FIG. 7, a V2X communication system may comprise a terminal (e.g., a terminal located in a vehicle), a base station, and the like. For example, the terminal of FIG. 7 may be the terminal located in vehicle 100 of FIG. 1, and the base station of FIG. 7 may be a base station belonging to the cellular communication system 140 of FIG. 1. The terminal and the base station may be configured to be the same as or similar to the communication node 300 shown in FIG. 3. Also, the terminal may include the protocol stacks shown in FIGS. 4 to 6.

The V2X communication system may support the eMBB service, the URLLC service, and the mMTC service. For a low-latency communication service (e.g., URLLC service), the terminal may transmit an indicator (hereinafter referred to as "URLLC request indicator") requesting provision of the URLLC service to the base station (S701). For example, sidelink UE information including the URLLC request indicator may be transmitted from the terminal to the base station.

The base station may receive the URLLC request indicator from the terminal, and may configure RLF triggering information (e.g., RLF triggering condition) in consideration of the requirements of the URLLC service (S702). The RLF triggering information may include a threshold (hereinafter referred to as "out-of-sync threshold") used for detecting unsynchronization (e.g., out of synchronization or asynchronization) and N310. The out-of-sync threshold may be set to a block error rate (BLER) of $10^{-6}$. That is, an out-of-sync threshold for a communication service (e.g., eMBB service) other than the URLLC service may be set to a BLER of $10^{-3}$, and the out-of-sync threshold for the URLLC service may be set to the BLER of $10^{-6}$.

N310 may be a threshold for the number of unsynchronization indications and may be used to determine whether a problem has occurred in the radio link. For example, when the number of unsynchronization indications received from a lower layer (e.g., PHY layer) of the terminal is equal to or greater than N310, an upper layer (e.g., MAC layer, RLC layer, or PDCP layer) of the terminal may determine that a problem has occurred in the radio link. N310 for the URLLC service may be less than N310 for a communication service (e.g., eMBB service) other than the URLLC service.

The base station may transmit an RRC message (e.g., RRC connection reconfiguration message) including the RLF triggering information to the terminal (S703). Alternatively, a MAC control element (CE) or downlink control information (DCI) including the RLF triggering information may be transmitted from the base station to the terminal. The terminal may receive the RLF triggering information from the base station, and perform a radio link measurement procedure using the out-of-sync threshold and N310 included in the RLF triggering information (S704).

For example, the lower layer of the terminal may receive a reference signal, a synchronization signal/physical broadcast channel (SS/PBCH) block, or a channel from the base station. If a BLER for the reference signal, SS/PBCH block, or channel is equal to or greater than the out-of-sync threshold, the lower layer of the terminal may transmit the unsynchronization indication to the upper layer of the terminal. Here, the reference signal may be a channel state information-reference signal (CSI-RS), a demodulation-reference signal (DM-RS), a phase tracking reference signal (PT-RS), or a cell specific reference signal (CRS). The channel may be a physical downlink control channel (PDCCH) or a physical downlink shared channel (PDSCH).

The upper layer of the terminal may receive the unsynchronization indication from the lower layer of the terminal, and may determine that a problem has occurred in the radio link when the number of the received unsynchronization indications is equal to or greater than N310. In this case, the terminal may perform a radio link recovery procedure during a duration beginning when the problem of the radio link is detected until expiration of a preconfigured timer (e.g., T310). If the radio link is not recovered before the expiration of timer T310, the terminal may declare an RLF.

Also, regardless of the expiration of timer T310, the terminal may perform the V2X communication using a resource arbitrarily selected within an exceptional resource pool indicated by an SIB received from the base station (S705). That is, the terminal may transmit URLLC data using the resource arbitrarily selected within the exceptional resource pool even before the expiration of timer T310. The URLLC data may be data transmitted and received according to the requirements of the URLLC service.

Figure 8:
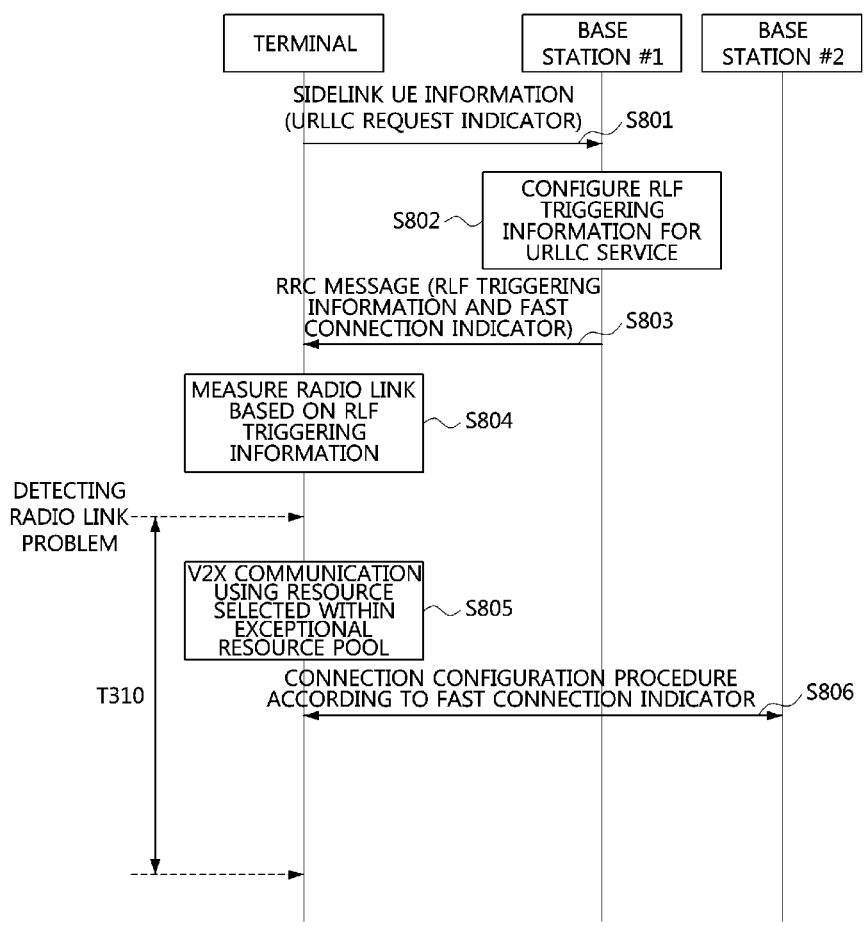
FIG. 8 is a sequence chart illustrating a second embodiment of a low-latency communication method in a V2X communication system.

FIG. 8 is a sequence chart illustrating a second embodiment of a low-latency communication method in a V2X communication system.

As shown in FIG. 8, a V2X communication system may comprise a terminal (e.g., a terminal located in a vehicle), a base station #1, a base station #2, and the like. For example, the terminal of FIG. 8 may be the terminal located in the vehicle 100 of FIG. 1, and the base stations #1 and #2 of FIG. 8 may be the base stations belonging to the cellular communication system 140 of FIG. 1. The base station #1 may be a serving base station of the terminal. The base station #2 may be a candidate base station to which the terminal attempts to connect when an RLF occurs between the terminal and the base station #1. The terminal may know in advance existence of the base station #2. The terminal, the base station #1, and the base station #2 may be configured to be the same as or similar to the communication node 300 shown in FIG. 3. Also, the terminal may include the protocol stacks shown in FIGS. 4 to 6.

The V2X communication system may support the eMBB service, the URLLC service, and the mMTC service. For a low-latency communication service (e.g., URLLC service), the terminal may transmit a URLLC request indicator to the base station #1 (S801). For example, sidelink UE information including the URLLC request indicator may be transmitted from the terminal to the base station #1.

The base station #1 may receive the URLLC request indicator from the terminal, and may configure RLF triggering information (e.g., RLF triggering condition) in consideration of the requirements of the URLLC service (S802). The RLF triggering information may include an out-of-sync threshold and N310. The out-of-sync threshold may be set to a BLER of $10^{-6}$. That is, an out-of-sync threshold for a communication service (e.g., eMBB service) other than the URLLC service may be set to a BLER of $10^{-3}$, and the out-of-sync threshold for the URLLC service may be set to the BLER of $10^{-6}$.

N310 may be a threshold for the number of unsynchronization indications and may be used to determine whether a problem has occurred in the radio link. N310 for the URLLC service may be less than N310 for a communication service (e.g., eMBB service) other than the URLLC service.

The base station #1 may transmit an RRC message (e.g., RRC connection reconfiguration message) including the RLF triggering information and a fast connection indicator to the terminal (S803). Alternatively, a MAC CE or a DCI including the RLF triggering information and the fast connection indicator may be transmitted from the base station #1 to the terminal. The fast connection indicator may instruct the terminal to perform a connection configuration procedure with another base station even before expiration of a preconfigured timer (e.g., T310) when the problem in the radio link is detected.

The terminal may receive the RLF triggering information and the fast connection indicator from the base station #1, and perform a radio link measurement procedure using the out-of-sync threshold and N310 included in the RLF triggering information (S804). For example, the lower layer of the terminal may receive a reference signal, an SS/PBCH block, or a channel from the base station. If a BLER for the reference signal, SS/PBCH block, or channel is equal to or greater than the out-of-sync threshold, the lower layer of the terminal may transmit the unsynchronization indication to the upper layer of the terminal.

The upper layer of the terminal may receive the unsynchronization indication from the lower layer of the terminal, and may determine that a problem has occurred in the radio link when the number of the received unsynchronization indications is equal to or greater than N310. In this case, the terminal may perform a radio link recovery procedure during a duration beginning when the problem of the radio link is detected until the expiration of the preconfigured timer (e.g., T310). If the radio link is not recovered before the expiration of timer T310, the terminal may declare an RLF.

Also, regardless of the expiration of timer T310, the terminal may perform the V2X communication using a resource arbitrarily selected within an exceptional resource pool indicated by an SIB received from the base station #1 (S805). That is, the terminal may transmit URLLC data using the resource arbitrarily selected within the exceptional resource pool even before the expiration of timer T310.

Also, regardless of whether the expiration of timer T310, the terminal may perform a connection configuration procedure with a neighboring base station (e.g., the base station #2) according to the instruction of the fast connection indicator (S806). That is, the terminal may perform the connection configuration procedure with the base station #2 even before the expiration of the timer T310. In the connection configuration procedure, a random access procedure and an RRC connection establishment procedure may be performed. Here, a cause of the connection configuration may be set to "vehicle RLF avoidance." Alternatively, the terminal may perform a connection configuration procedure with another beam of the base station #1 instead of the connection configuration procedure with the base station #2. The step S806 may be performed simultaneously with the step S805. Alternatively, the step S806 may be performed before or after the step S805.

If the radio link is not recovered before the expiration of timer T310, the terminal may perform the V2X communication with the base station #2 (i.e., the base station #2 that has performed the connection configuration procedure with the terminal in the step S806) after the expiration of timer T310. Alternatively, the terminal may perform V2X communication using another beam of the base station #1 after the expiration of the timer T310.

On the other hand, if the radio link is recovered before the expiration of timer T310, a connection release procedure between the terminal and the base station #2 may be performed. For example, the terminal may transmit an identifier of the base station #2 to the base station #1. The base station #1 may receive the identifier of the base station #2 from the terminal, and may transmit to the base station #2 an indicator to request the release of the connection configuration with the terminal. The base station #2 may release the connection configuration with the terminal according to the request of the base station #1.

Figure 9:
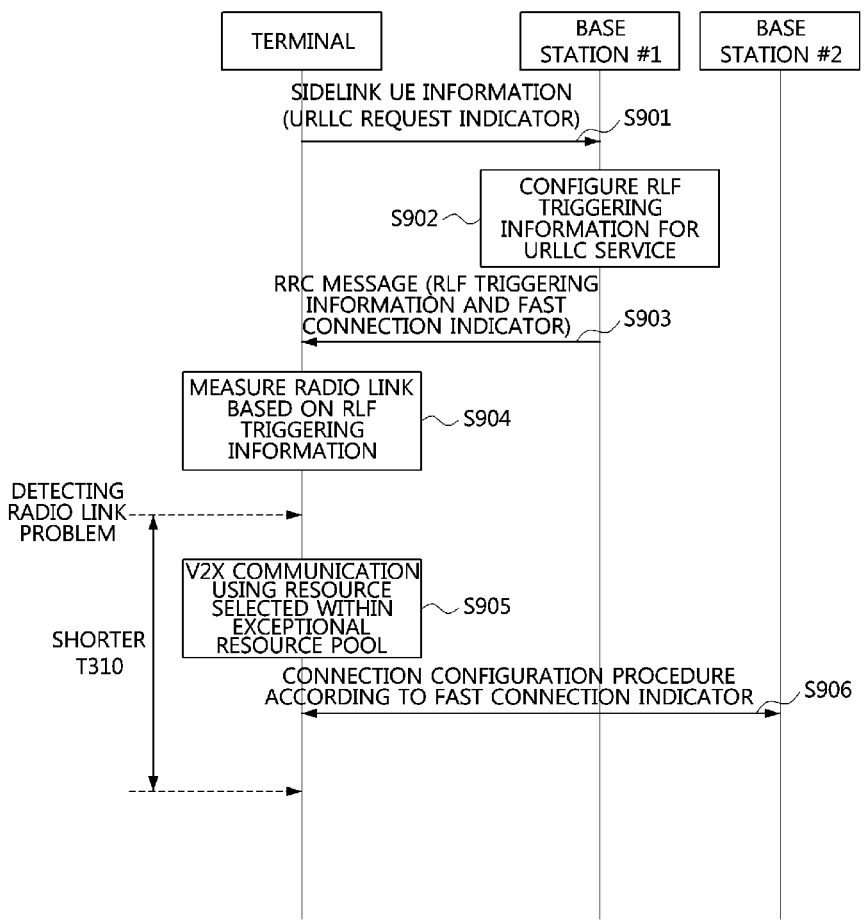
FIG. 9 is a sequence chart illustrating a third embodiment of a low-latency communication method in a V2X communication system.

FIG. 9 is a sequence chart illustrating a third embodiment of a low-latency communication method in a V2X communication system.

As shown in FIG. 9, a V2X communication system may comprise a terminal (e.g., a terminal located in a vehicle), a base station #1, a base station #2, and the like. For example, the terminal of FIG. 9 may be the terminal located in the vehicle 100 of FIG. 1, and the base stations #1 and #2 of FIG. 9 may be the base stations belonging to the cellular communication system 140 of FIG. 1. The base station #1 may be a serving base station of the terminal. The base station #2 may be a candidate base station to which the terminal attempts to connect when an RLF occurs between the terminal and the base station #1. The terminal may know in advance existence of the base station #2. The terminal, the base station #1, and the base station #2 may be configured to be the same as or similar to the communication node 300 shown in FIG. 3. Also, the terminal may include the protocol stacks shown in FIGS. 4 to 6.

The V2X communication system may support the eMBB service, the URLLC service, and the mMTC service. For a low-latency communication service (e.g., URLLC service), the terminal may transmit a URLLC request indicator to the base station #1 (S901). For example, sidelink UE information including the URLLC request indicator may be transmitted from the terminal to the base station #1.

The base station #1 may receive the URLLC request indicator from the terminal, and may configure RLF triggering information (e.g., RLF triggering condition) in consideration of the requirements of the URLLC service (S902). The RLF triggering information may include an out-of-sync threshold, N310 and timer T310. The out-of-sync threshold may be set to a BLER of $10^{-6}$. That is, an out-of-sync threshold for a communication service (e.g., eMBB service) other than the URLLC service may be set to a BLER of $10^{-3}$, and the out-of-sync threshold for the URLLC service may be set to the BLER of $10^{-6}$.

N310 may be a threshold for the number of unsynchronization indications and may be used to determine whether a problem has occurred in the radio link. N310 for the URLLC service may be less than N310 for a communication service (e.g., eMBB service) other than the URLLC service. The timer T310 may be a timer used to indicate a duration in which the recovery procedure of the radio link is performed, and may start when the problem of the radio link is detected. The timer T310 for the URLLC service may be less than timer T310 for a communication service (e.g., eMBB service) other than the URLLC service.

The base station #1 may transmit an RRC message (e.g., RRC connection reconfiguration message) including the RLF triggering information and a fast connection indicator to the terminal (S903). Alternatively, a MAC CE or a DCI including the RLF triggering information and the fast connection indicator may be transmitted from the base station #1 to the terminal. The fast connection indicator may instruct the terminal to perform a connection configuration procedure with another base station even before expiration of a preconfigured timer (e.g., T310) when the problem of the radio link is detected.

The terminal may receive the RLF triggering information and the fast connection indicator from the base station #1, and perform a radio link measurement procedure using the out-of-sync threshold and N310 included in the RLF triggering information (S904). For example, the lower layer of the terminal may receive a reference signal, an SS/PBCH block, or a channel from the base station. If a BLER for the reference signal, SS/PBCH block, or channel is equal to or greater than the out-of-sync threshold, the lower layer of the terminal may transmit the unsynchronization indication to the upper layer of the terminal.

The upper layer of the terminal may receive the unsynchronization indication from the lower layer of the terminal, and may determine that a problem has occurred in the radio link when the number of the received unsynchronization indications is equal to or greater than N310. In this case, the terminal may perform a radio link recovery procedure during a duration beginning when the problem of the radio link is detected until the expiration of the preconfigured timer (e.g., T310). If the radio link is not recovered before the expiration of timer T310, the terminal may declare an RLF. Since timer T310 of the embodiment shown in FIG. 9 is less than timer T310 of the embodiment shown in FIG. 8, the transmission latency in the embodiment shown in FIG. 9 may be less than the transmission latency in the embodiment shown in FIG. 8.

Also, regardless of the expiration of timer T310, the terminal may perform the V2X communication using a resource arbitrarily selected within an exceptional resource pool indicated by an SIB received from the base station #1 (S905). That is, the terminal may transmit URLLC data using the resource arbitrarily selected within the exceptional resource pool even before the expiration of timer T310.

Also, regardless of whether the expiration of timer T310, the terminal may perform a connection configuration procedure with a neighboring base station (e.g., the base station #2) according to the instruction of the fast connection indicator (S906). That is, the terminal may perform the connection configuration procedure with the base station #2 even before the expiration of the timer T310. In the connection configuration procedure, a random access procedure and an RRC connection establishment procedure may be performed. Here, a cause of the connection configuration may be set to "vehicle RLF avoidance." Alternatively, the terminal may perform a connection configuration procedure with another beam of the base station #1 instead of the connection configuration procedure with the base station #2. The step S906 may be performed simultaneously with the step S905. Alternatively, the step S906 may be performed before or after the step S905.

If the radio link is not recovered before the expiration of timer T310, the terminal may perform the V2X communication with the base station #2 (i.e., the base station #2 that has performed the connection configuration procedure with the terminal in the step S906) after the expiration of timer T310. Alternatively, the terminal may perform V2X communication using another beam of the base station #1 after the expiration of the timer T310.

On the other hand, if the radio link is recovered before the expiration of timer T310, a connection release procedure between the terminal and the base station #2 may be performed. For example, the terminal may transmit an identifier of the base station #2 to the base station #1. The base station #1 may receive the identifier of the base station #2 from the terminal, and may transmit to the base station #2 an indicator to request the release of the connection configuration with the terminal. The base station #2 may release the connection configuration with the terminal according to the request of the base station #1.

Figure 10:
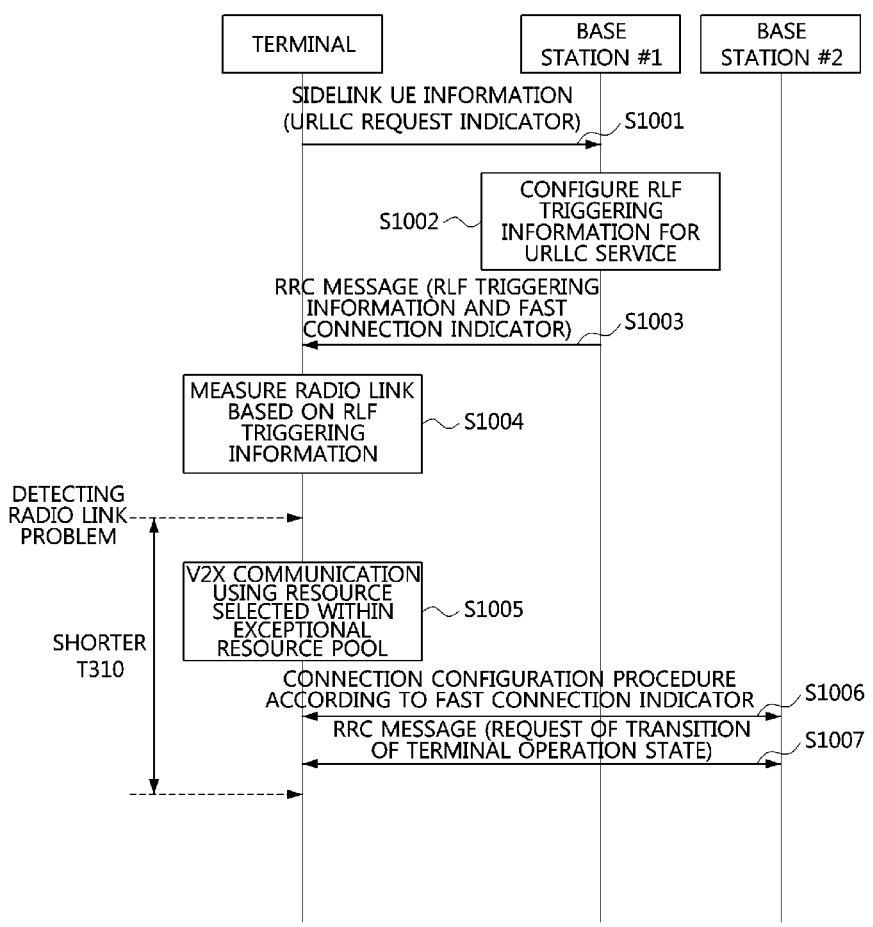
FIG. 10 is a sequence chart illustrating a fourth embodiment of a low-latency communication method in a V2X communication system.

FIG. 10 is a sequence chart illustrating a fourth embodiment of a low-latency communication method in a V2X communication system.

As shown in FIG. 10, a V2X communication system may comprise a terminal (e.g., a terminal located in a vehicle), a base station #1, a base station #2, and the like. For example, the terminal of FIG. 10 may be the terminal located in the vehicle 100 of FIG. 1, and the base stations #1 and #2 of FIG. 10 may be the base stations belonging to the cellular communication system 140 of FIG. 1. The base station #1 may be a serving base station of the terminal. The base station #2 may be a candidate base station to which the terminal attempts to connect when an RLF occurs between the terminal and the base station #1. The terminal may know in advance existence of the base station #2. The terminal, the base station #1, and the base station #2 may be configured to be the same as or similar to the communication node 300 shown in FIG. 3. Also, the terminal may include the protocol stacks shown in FIGS. 4 to 6.

The V2X communication system may support the eMBB service, the URLLC service, and the mMTC service. For a low-latency communication service (e.g., URLLC service), the terminal may transmit a URLLC request indicator to the base station #1 (S1001). For example, sidelink UE information including the URLLC request indicator may be transmitted from the terminal to the base station #1.

The base station #1 may receive the URLLC request indicator from the terminal, and may configure RLF triggering information (e.g., RLF triggering condition) in consideration of the requirements of the URLLC service (S1002). The RLF triggering information may include an out-of-sync threshold, N310 and timer T310. The out-of-sync threshold may be set to a BLER of $10^{-6}$. That is, an out-of-sync threshold for a communication service (e.g., eMBB service) other than the URLLC service may be set to a BLER of $10^{-3}$, and the out-of-sync threshold for the URLLC service may be set to the BLER of $10^{-6}$.

N310 may be a threshold for the number of unsynchronization indications and may be used to determine whether a problem has occurred in the radio link. N310 for the URLLC service may be less than N310 for a communication service (e.g., eMBB service) other than the URLLC service. The timer T310 may be a timer used to indicate a duration in which the recovery procedure of the radio link is performed, and may start when the problem of the radio link is detected. The timer T310 for the URLLC service may be less than timer T310 for a communication service (e.g., eMBB service) other than the URLLC service.

The base station #1 may transmit an RRC message (e.g., RRC connection reconfiguration message) including the RLF triggering information and a fast connection indicator to the terminal (S1003). Alternatively, a MAC CE or a DCI including the RLF triggering information and the fast connection indicator may be transmitted from the base station #1 to the terminal. The fast connection indicator may instruct the terminal to perform a connection configuration procedure with another base station even before expiration of a preconfigured timer (e.g., T310) when the problem of the radio link is detected.

The terminal may receive the RLF triggering information and the fast connection indicator from the base station #1, and perform a radio link measurement procedure using the out-of-sync threshold and N310 included in the RLF triggering information (S1004). For example, the lower layer of the terminal may receive a reference signal, an SS/PBCH block, or a channel from the base station. If a BLER for the reference signal, SS/PBCH block, or channel is equal to or greater than the out-of-sync threshold, the lower layer of the terminal may transmit the unsynchronization indication to the upper layer of the terminal.

The upper layer of the terminal may receive the unsynchronization indication from the lower layer of the terminal, and may determine that a problem has occurred in the radio link when the number of the received unsynchronization indications is equal to or greater than N310. In this case, the terminal may perform a radio link recovery procedure during a duration beginning when the problem of the radio link is detected until the expiration of the preconfigured timer (e.g., T310). If the radio link is not recovered before the expiration of timer T310, the terminal may declare an RLF.

Also, regardless of the expiration of timer T310, the terminal may perform the V2X communication using a resource arbitrarily selected within an exceptional resource pool indicated by an SIB received from the base station #1 (S1005). That is, the terminal may transmit URLLC data using the resource arbitrarily selected within the exceptional resource pool even before the expiration of timer T310.

Also, regardless of whether the expiration of timer T310, the terminal may perform a connection configuration procedure with a neighboring base station (e.g., the base station #2) according to the instruction of the fast connection indicator (S1006). That is, the terminal may perform the connection configuration procedure with the base station #2 even before the expiration of the timer T310. In the connection configuration procedure, a random access procedure and an RRC connection establishment procedure may be performed. Here, a cause of the connection configuration may be set to "vehicle RLF avoidance." Alternatively, the terminal may perform a connection configuration procedure with another beam of the base station #1 instead of the connection configuration procedure with the base station #2. The step S1006 may be performed simultaneously with the step S1005. Alternatively, the step S1006 may be performed before or after the step S1005.

When the connection configuration procedure between the terminal and the base station #2 is completed, an operation state of the terminal connected to the base station #2 may be an RRC connected state. In this case, the base station #2 may transmit an RRC message (e.g., an RRC connection release message) requesting a transition from the RRC connected state to an RRC inactive state to the terminal (S1007). The terminal may receive the RRC message from the base station #2, and may transition from the RRC connected state to the RRC active state according to the request of the RRC message.

If the radio link is not recovered before the expiration of timer T310, the terminal may perform V2X communication with the base station #2 (i.e., the base station #2 that has performed the connection configuration procedure with the terminal in the step S1006) after expiration of timer T310. The V2X communication between the terminal and the base station #2 may be performed after the operation state of the terminal transitions from the RRC inactive state to the RRC connected state. That is, the terminal may transition from the RRC inactive state to the RRC connected state by performing a preconfigured transition procedure (e.g., a random access procedure) with the base station #2. The terminal operating in the RRC connected state may perform V2X communication with the base station #2. Alternatively, the terminal may perform V2X communication using another beam of the base station #1 after the expiration of timer T310.

On the other hand, if the radio link is recovered before the expiration of timer T310, a connection release procedure between the terminal and the base station #2 may be performed. For example, the terminal may transmit an identifier of the base station #2 to the base station #1. The base station #1 may receive the identifier of the base station #2 from the terminal, and may transmit to the base station #2 an indicator to request the release of the connection configuration (e.g., inactive configuration) with the terminal. The base station #2 may release the connection configuration (e.g., inactive configuration) with the terminal according to the request of the base station #1.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   receiving, from a first base station, a radio link failure (RLF) triggering condition including a first threshold of a low-latency communication service for determining whether a problem has occurred in a radio link between the terminal and the first base station, the first threshold being configured to be less than a third threshold for triggering a second recovering procedure in a normal communication service other than the low-latency communication service;
   measuring the radio link based on the first threshold instead of the third threshold to provide the low-latency communication service;
   determining that the problem of the radio link is detected when a number of unsynchronization detected in the radio link is more than the first threshold;
   in response to detecting the problem of the radio link, performing a connection configuration procedure with a second base station which is different from the first base station;
   operating in a radio resource control (RRC) connected state after the connection configuration procedure is completed;
   receiving, from the second base station, a message for requesting state transition from the RRC connected state to a RRC inactive state; and
   transitioning an operation state of the terminal from the RRC connected state to the RRC inactive state when the message is received,
   wherein the second recovering procedure is triggered by the third threshold to provide the normal communication service other than the low-latency communication service, and each of the first threshold and the third threshold is a different natural number.

2. The operation method according to claim 1, further comprising:
   in response to detecting the problem of the radio link, selecting a resource within an exceptional resource pool indicated by the first base station; and
   performing communication with the first base station using the selected resource during a duration beginning when the problem of the radio link is detected until a timer used for declaring an RLF expires.

3. The operation method according to claim 2, further comprising, when the radio link is recovered before the timer expires, performing a connection release procedure between the terminal and the second base station after the timer expires.

4. The operation method according to claim 2, further comprising, when the radio link is not recovered before the timer expires, performing communication with the second base station after the timer expires.

5. The operation method according to claim 1, wherein the RLF triggering condition is received through an RRC message, a medium access control (MAC) control element (CE), or downlink control information (DCI).

6. The operation method according to claim 1, wherein the RLF triggering condition further includes a second threshold for detecting unsynchronization in the low-latency communication service, the second threshold being less than a corresponding threshold for the normal communication service other than the low-latency communication service.

7. The operation method according to claim 6, wherein the second threshold is a block error rate (BLER) of $10^{-6}$.

8. The operation method according to claim 1, wherein the first threshold for the low-latency communication service is a threshold for a number of unsynchronization indications.

9. The operation method according to claim 1, wherein the RLF triggering condition further includes a timer value of the timer for the low-latency communication service, the timer value being less than a corresponding timer value for the normal communication service other than the low-latency communication service.

10. An operation method of a first base station in a communication system, the operation method comprising:
configuring a first threshold for determining whether a problem has occurred in a radio link between the first base station and a terminal according to requirements of a low-latency communication service, the first threshold being configured to be less than a third threshold for a normal communication service other than the low-latency communication service;
configuring a radio link failure (RLF) triggering condition including the first threshold;
transmitting the RLF triggering condition to the terminal;
after recovering the radio link between the first base station and the terminal, receiving, from the terminal, an identifier of a second base station to which the terminal is connected; and
transmitting, to the second base station, an indicator for requesting connection release between the second base station and the terminal,
wherein the first threshold is used for triggering a first procedure for recovering the problem of the radio link to the low-latency communication service, the third threshold is used for triggering a second procedure for recovering the problem of the radio link to the normal communication service, and each of the first threshold and the third threshold is a different natural number.

11. The operation method according to claim 10, further comprising, in response to detecting the problem of the radio link, performing communication with the terminal using an exceptional resource pool indicated by the base station during a duration beginning when the problem of the radio link is detected until a timer used for declaring the RLF expires.

12. The operation method according to claim 10, wherein the RLF triggering condition further includes a second threshold for detecting unsynchronization in the low-latency communication service, the second threshold being less than a corresponding threshold for the normal communication service other than the low-latency communication service.

13. The operation method according to claim 10, wherein the RLF triggering condition further includes a timer value of the timer for the low-latency communication service, the timer value being less than a corresponding timer value for the normal communication service other than the low-latency communication service.

14. A terminal in a communication system, the terminal comprising a processor and a memory storing at least one instruction, wherein, when the at least one instruction is executed by the processor, the processor is configured to:
receive, from a first base station, a radio link failure (RLF) triggering condition including a first threshold of a low-latency communication service for determining whether a problem has occurred in a radio link between the terminal and the first base station, the first threshold being configured to be less than a third threshold for triggering a second recovering procedure in a normal communication service other than the low-latency communication service;
measure the radio link based on the first threshold instead of the third threshold to provide the low-latency communication service;
determine that the problem of the radio link is detected when a number of unsynchronization detected in the radio link is more than the first threshold;
in response to detecting the problem of the radio link, performing a connection configuration procedure with a second base station which is different from the first base station;
operate in a radio resource control (RRC) connected state after the connection configuration procedure is completed;
receive, from the second base station, a message for requesting state transition from the RRC connected state to a RRC inactive state; and
transition an operation state of the terminal from the RRC connected state to the RRC inactive state when the message is received,
wherein the second recovering procedure is triggered by the third threshold to provide the normal communication service other than the low-latency communication service, and each of the first threshold and the third threshold is a different natural number.

15. The terminal according to claim 14, wherein the processor is further configured to, in response to detecting a problem of the radio link, select a resource within an exceptional resource pool indicated by the first base station, and perform communication with the first base station using the selected resource during a duration beginning when the problem of the radio link is detected until a timer used for declaring an RLF expires.

16. The terminal according to claim 14, wherein the processor is further configured to, when the radio link is recovered before the timer expires, perform a connection release procedure between the terminal and the second base station after the timer expires.

17. The terminal according to claim 14, wherein the processor is further configured to, when the radio link is not recovered before the timer expires, perform communication with the second base station after the timer expires.

* * * * *